May 16, 1967 J. G. DILL 3,320,464

INVERTED SOLID STATE TRIODE AND TETRODE DEVICES

Filed May 6, 1963 3 Sheets-Sheet 1

INVENTOR
JOHANN G. DILL,
BY
W. Hume Allister Jr.
ATTORNEY.

INVERTED SOLID STATE TRIODE AND TETRODE DEVICES

Filed May 6, 1963

3 Sheets-Sheet 2

INVENTOR.
JOHANN G. DILL,
BY
W. Hulse Allister Jr.
ATTORNEY.

May 16, 1967 J. G. DILL 3,320,464

INVERTED SOLID STATE TRIODE AND TETRODE DEVICES

Filed May 6, 1963 3 Sheets-Sheet 3

INVENTOR.
JOHANN G. DILL,
BY W. H. [signature]
ATTORNEY

United States Patent Office 3,320,464
Patented May 16, 1967

3,320,464
INVERTED SOLID STATE TRIODE AND TETRODE DEVICES

Johann G. Dill, Costa Mesa, Calif., assignor to Hughes Aircraft Company, Culver City, Calif., a corporation of Delaware Filed May 6, 1963, Ser. No. 278,362
13 Claims. (Cl. 313—258)

This invention relates to transistor devices and especially to transistor devices utilizing space-charge-limited current injection operable at ultra-high frequencies. More particularly the invention relates to a thin-film transistor structure.

Operation of transistors of the type to which the present invention appertains is based upon the control of injected majority carriers in a wide bandgap semiconductor or semi-insulator material by means of an insulated control gate. These devices are analogous to triode vacuum tubes except that the transistors of the present invention are solid state and all components including the semi-insulator as well as the necessary electrodes are usually deposited by evaporation upon a substrate. In the triode vacuum tube electrons emitted by the cathode flow through the vacuum to the anode and the density of these electrons may be controlled by a grid electrode interposed between the cathode and plate electrodes. In the transistors of the present invention majority charge carriers are injected into the solid state semi-insulator material by an electrode usually called the "source," and these majority carriers move or flow in the insulator toward a second electrode called the "drain." The control electrode, which by its field effect in the semi-insulator can vary the density of majority carriers reaching the drain, is called the "gate" and it is usually insulated from the semi-insulator material to prevent majority carriers from flowing to it. In comparison with semiconductor devices of the junction type in which charge carriers already available in the semiconductor body are injected a junction between regions of opposite conductivity type, charge carriers in the thin-film transistor of the invention are normally not available in the body of semi-insulator material and are injected thereinto from an electrode having a lower work function than the work function of the semi-insulator.

Such devices are known in the art and the structure and operation thereof have been amply described, especially by P. K. Weimer, in an article entitled "The TFT—A New Thin-Film Transistor," published in the June 1962 Proceedings of the I.R.E. commencing on page 1462. In one arrangement the thin-film transistors have the source and drain electrodes disposed side-by-side with the gate arranged over the space between the source and drain and separated therefrom by the semi-insulator. A typical arrangement is shown in FIGURE 1 of the above-mentioned Weimer article. Insulating the gate electrode from the semi-insulator material is also suggested so that the gate electrode will not itself act as a source or drain electrode and may yet exert its control by field effect in the space between the source and drain electrodes. A structure is also disclosed wherein a perforated gate is immersed in the semi-insulator material between the drain and the source electrodes in a vertical configuration with the gate electrode being surrounded and isolated from the semi-insulator material by an insulator material such as silicon oxide. This permits the control or gate electrode to be placed between the drain and source electrodes where it can be most effective; the gate electrode is perforated so as to avoid blocking the flow of charge carriers between the source and the drain electrodes. This prior art insulated grid-gate arrangement is analogous to a vacuum tube triode having, in the order named, a cathode, grid, and plate. Such an electrode arrangement necessarily results in excessive spacing between the source and drain electrodes to accommodate the grid or gate electrode which is a severe disadvantage. Since the electrons or charge carriers have a very slow speed in the semi-insulator material, a very narrow source-drain distance is required in order to achieve a useful gain-bandwidth product in the microwave region.

It is, therefore, an object of the present invention to provide an improved thin-film transistor.

Another object of the invention is to provide an improved thin-film transistor having a useful gain-bandwidth product in the microwave region.

Still another object of the invention is to provide an improved thin-film transistor having a very narrow source-drain distance and effective control of the field therebetween.

These and other objects and advantages of the invention are realized by a thin-film transistor structure in which the control electrode or gate acts through a perforated or screen-type drain electrode which is disposed adjacent the source electrode and spaced therefrom by any desired thickness of semi-insulator material. By analogy to the vacuum tube, the thin-film device of the present invention may be considered as an "inverted" solid state triode in which the anode plate is preferred and disposed between the cathode and grid. With the inverted structure of the present thin-film device it is also contemplated to incorporate a screen electrode between the control electrode and the drain to provide an inverted solid state tetrode structure to reduce the feedback capacity between the control electrode and the drain.

The invention will be described in greater detail by reference to the drawings in which.

Figure 1:
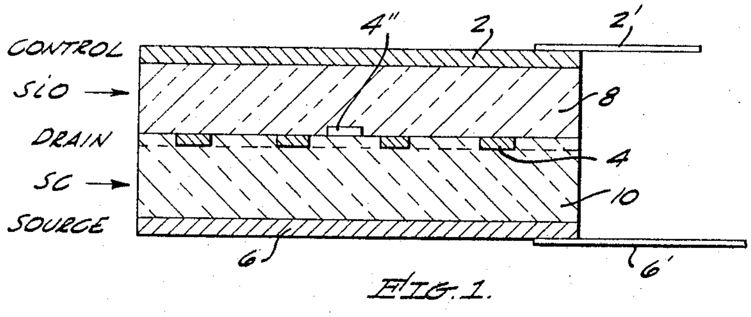
FIGURE 1 is a cross-sectional elevational view of a solid state triode device according to the invention.
Figure 1A:
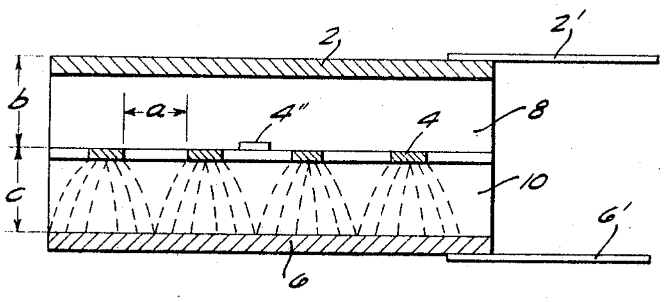
FIGURE 1(A) is the same view of the device shown in FIGURE 1 but with some of the cross-hatching omitted in order to more clearly portray electrical fields and current paths as well as to permit convenient indication of dimensional relationships involved in the solid state device of the invention.
Figure 2:
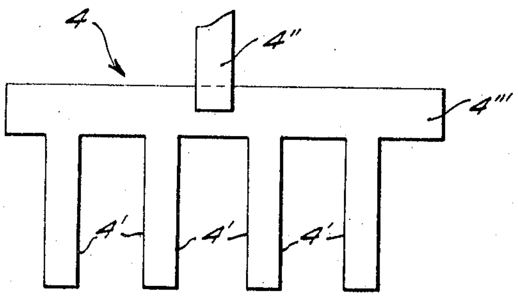
FIGURE 2 is a plan view of one embodiment of an electrode member shown in FIGURES 1 and 1(A)
Figure 7:
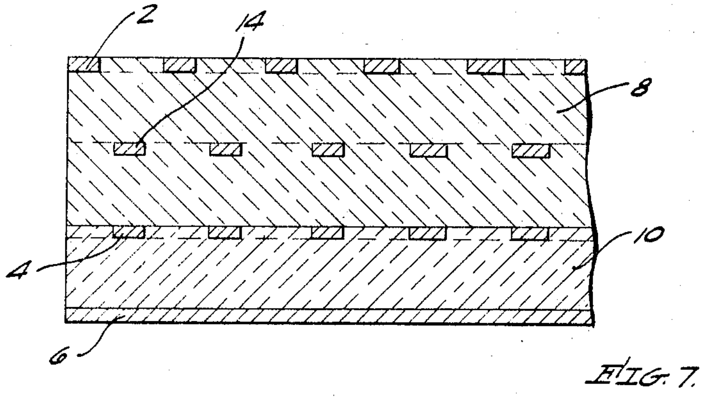
Figure 8:
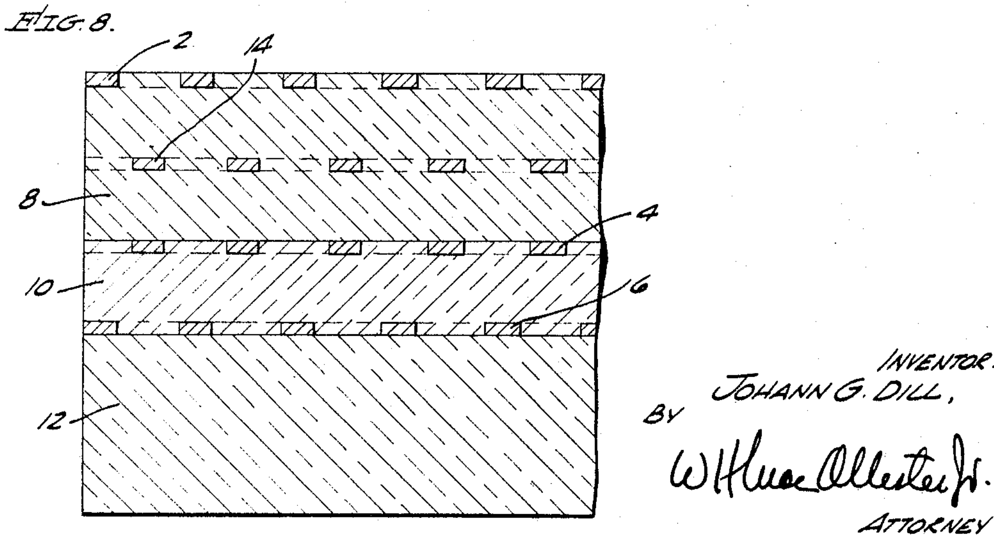

FIGURE 7 is a cross-sectional elevational view of another embodiment of a solid state tetrode device according to the invention; and FIGURE 8 is a cross-section elevational view of another embodiment of a solid state tetrode device according to the invention; and Referring now to FIGURES 1, and 1(A), and 2, a thin-film triode device is shown comprising a stacked or sandwich arrangement of a control or "gate" electrode 2, a grid-type drain electrode 4, and a source electrode 6. A layer 8 of electrically insulating material such as silicon oxide is disposed between the control and drain electrodes 2 and 4. Between the drain and source electrodes 4 and 6 is disposed a layer 10 of semiconductor or semi-insulator material such as cadmium sulfide. In this embodiment the control and source electrodes 2 and 6 may be continuous films of metal formed by vapor deposition, for example, as will be described in greater detail hereinafter. If vapor-deposited thin metal films are utilized for the control and drain electrode layers 2 and 6, it may be desirable and necessary to form one of these layers on a supporting substrate of either electrically insulating or conductive material. If an electrically insulating material such as glass, for example, is used for the substrate, then electrical connections must be provided to the source electrode. If an electrically conductive base or substrate is utilized then it will itself provide such electrical connection. It is also possible to utilize a metal plate, for example, for either a source or control electrode in which case no separate substrate or base may be required. Disposition of the electrodes on a substrate is a matter of convenience; either the source or gate electrode may be formed on the base or, in the case of metal plate structures, either or both may constitute a supporting base. Electrical connections to the control and source electrodes 2 and 6 may be provided by means of wires 2' and 6' which may be soldered or otherwise affixed to the respective electrode layers in good electrically conducting relationship.

It will thus be understood that the electrical device of the invention comprises a source electrode and a drain electrode separated by a body of semi-insulator material with the control electrode disposed adjacent the drain electrode and electrically insulated therefrom. As used herein and in the appended claims the following terms have the meaning indicated. "Source electrode" means the electrode which is in electrically conductive relationship with a body of semi-insulator material and which injects charge carriers into this body. "Drain electrode" means the electrode which is also in electrically conductive relationship with another portion of the body of semi-insulator material and which collects charge carriers therefrom including those injected thereinto by the source electrode. "Control or gate electrode" means the electrode disposed adjacent the drain electrode and not in electrically conductive relationship with either the drain electrode or the body of semi-insulator material but which is capable of establishing an electric field in the semi-insulator body so as to control the flow of charge carriers between the source and drain electrodes. The term "semi-insulator" material means a material which has substantially no intrinsic charge carriers therein for the conductance of current but which is capable of having charge carriers injected thereinto from a material having a lower work function than that of the semi-insulator.

Since the drain electrode 4 according to the invention is disposed between the control and source electrodes 2 and 6, it is preferable that the drain electrode 4 be perforated or grid-like in order to enhance the action of the electric field of the control electrode 2 to reach through the drain electrode 4 so as to control the flow of majority charge carriers between the drain and source electrodes 4 and 6. One convenient arrangement of the drain electrode 4 is shown best in FIGURE 2 wherein this electrode is in the form of a comb-like grid whose "teeth" or grid portions 4' extend between the insulating and semiconductor layers 8 and 10, electrical connections being provided by soldering or otherwise affixing a lead wire 4'' or the like to the back portion 4''' of the comb-like structure. As used herein the term "grid portions" refers to the solid portions of the electrode which defines the openings therein. Other configurations and arrangements of the drain electrode 4 are feasible it only being necessary that the drain electrode not be continuous or otherwise "opaque" to the control effect of the electric field of the control electrode 2.

In order to permit the flow of majority charge carriers in the semi-insulator film or layer 10 from the source electrode 10 to the drain electrode 4, the work function relationships of these electrodes with respect to the work functions of the semi-insulator layer 10 must be considered. In comparison with semiconductor devices of the junction type in which intrinsic charge carriers, already available in the semiconductor body, are injected across a junction between regions of opposite conductivity type, charge carriers in the thin-film devices of the invention are normally not available in the body of semi-insulator material and must be injected thereinto from an electrode having a lower work function than that of the semi-insulator. In these thin-film devices the charge carriers are injected into the solid semi-insulator film or layer 10 just as electrons are emitted into the vacuum space in an electron tube by the cathode.

As just indicated, the work function of the source electrode 6 should be lower than the work function of the semi-insulator layer 10. The work function of the drain electrode 4 should be such as to be higher than the work function of the semi-insulator. These conditions may be achieved by forming the source electrode 6 of indium, for example, and by forming the drain electrode 4 of gold, for example, in the case where the semi-insulator layer 10 is formed by cadmium sulfide. The work functions of gold and indium are, respectively, 4.8 ev. and 3.8 ev., while the work function of cadmium sulfide is 4.2 ev. Other satisfactory electrode materials which may be employed are: silver, aluminum, gallium, tellurium, and cadmium. Since the control electrode is electrically isolated from the source and drain electrodes by the insulator layer 8 at least as far as the possible movement of charge carriers in the semi-insulator layer 10 to the control electrode is concerned, the control electrode 2 may be formed of any suitable electrically conductive material such as gold, for example.

The triode device shown in FIGURES 1 and 1(A) may be conveniently fabricated by vacuum or vapor-deposition procedures as follows. The control electrode 2 may be in the form of a thin deposited film or a stamped sheet or plate of gold or any good electrically conductive material about 1000 angstroms thick, for example. It may be thick enough to be self-supporting as well as being capable of supporting the remaining portions of the device as suggested previously. In the case of deposited films it may be necesary to provide an insulating substrate to suport the control electrode 2 as well as the remaining structures of the device. After forming of the control electrode 2, a film or layer 8 of electrically insulating material may be deposited on the control electrode layer 2 by evaporating silicon monoxide, for example, on the electrode layer 2. This insulator layer may be about 1000 angstroms thick, for example.

The grid-like drain electrode 4 may be formed by evaporating gold onto the insulating layer 8 through a metal mask. The transverse connecting bar or "back" portion 4''' may be a thin gold plate which extends beyond the edge of the insulator film or layer 8 so as to be exposed for the purpose of permitting a lead wire 4'' to be connected thereto while the portion which is over the insulator layer 8 will be exposed through the mask to receive the gold being evaporated to form the "teeth" portions 4' so that these portions are in good electrically conducting relationship with the "back" portion 4'''. The grid portions 4' may be about 100–1000 angstroms thick, for example.

Next, after removal of the mask used to form the drain electrode 4, a layer 10 of semi-insulator or semi-conductor material is deposited over the drain electrode 4 and the portions of the insulator layer 8 exposed between the grid portions 4' thereof. This semi-insulator layer 10 may be about 0.5$\mu$ thick, for example. A suitable material may be cadmium sulfide deposited according to the process described in a co-pending application of R. Zuleeg, S.N. 241,854, filed Dec. 3, 1962, now abandoned, and assigned to the instant assignee. Other suitable semi-insulator materials in addition to cadmium sulfide are: cadmium telluride, cadium selenide, zinc sulfide, zinc selenide, zinc telluride, gallium arsenide, gallium phosphide, indium arsenide, indium phosphide, and indium antimonide. Such materials are especially useful because of their more advantageous physical properties among which are thermal stability and the ability to be vapor-deposited and plated with metal.

Fabrication of the thin-film triode of the invention is completed by evaporating a thin-film or layer 6 of induim, for example, over the semi-insulator layer 10 to form a source electrode. This electrode layer 6 may be about 1000 angstroms thick, for example. Electrical connection to the source electrode layer 6 may be provided by soldering or otherwise affixing a lead wire or tab 6′ thereto.

It will thus be understood that by this "inverted" triode construction the distance between the drain and source electrodes 4 and 6 may be as small as is possible by known fabrication techniques. Comparable narrow source-drain distances are not attainable by the triode constructions of the prior art because the prior art teaching that the control or gate electrode must be disposed between these electrodes in order to influence the flow of charge carriers therebetween. According to the present invention it has been discovered that the control electrode can be located adjacent the drain electrode and not between the source and drain electrodes and its electric field can still influence the flow of charge carriers between the source and drain electrodes reaching through the drain electrode. In referring to the control electrode being "adjacent" the drain electrode it is intended to mean near but not actually touching so as to be in electrically conductive relationship therewith although any insulating films or coatings and the like disposed on the control electrode may actually touch the drain electrode. The distance *b*, between the control and drain electrodes, and the distance *c*, between the drain and the source electrodes, should be smaller than or at least of the same order of magnitude as the minimum dimension *a* of the openings in the drain electrode in order to enhance the "reach through" action of the control electrode field. Thus, for example, in the device of FIGURES 1 and 1(A) the distance *a* of the openings between the grid portions 4′ of the drain electrode may be about 1000 angstroms and the thickness of the insulator layer 8 and of the semi-insulator layer 10 may be about 1000 angstroms. Under these circumstances the control electrode 2 will reach through the openings in the drain electrode 4 and control the flow of charge carriers between the drain and source electrodes 4 and 6 much as the control grid regulates the flow of electrons between the cathode and plate in a vacuum triode tube. Because of the extremely narrow source-drain distance available in thin-film triodes of the present invention, a useful gain-bandwidth product in the microwave region is attainable. Devices according to the invention are thus useful in amplifiers, high power and high frequency oscillators, RC resonance circuits and devices, and in high speed switching circuits.

Figure 3:
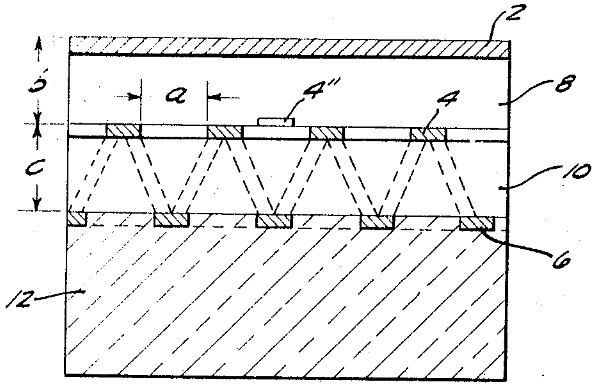
FIGURE 3 is an elevational view partly in cross-section of another embodiment of a solid state triode device according to the invention.

In view of the fact that by the arrangement of the present invention the control electrode is outside of the source-drainage space, it is desirable to use the best possible method of permitting the control electrode to influence the source-drain current. The control or influence of the control electrode may be viewed as being achieved by a perpendicular electric field with respect to the source electrode. Hence, as best seen in FIGURE 1(B) portions of the source-drain current may not be subject to control or influence by the control electrode. An alternate embodiment of the invention is shown in FIGURE 3 wherein a substantial portion of the source-drain current is subject to the perpendicular electric field established by the control electrode 2. In this embodiment the source electrode 6 may be of the grid-type corresponding in geometry and dimensions to the drain electrode 4 but so disposed with respect thereto that the grid portions are alternately spaced with respect to the grid portions of the drain electrode. In other words, the grid portions of the source electrode 6 are aligned with the openings in the drain electrode and thus directly exposed to the control electrode 2 through these openings. By this arrangement the source-drain current is substantially entirely subject to the influence of the perpendicular control field established by the control electrode.

It will also be appreciated that the thin-film triode devices of the invention may be subject to feed-back capacitance between the drain and control electrodes. This capacitance may be reduced by the arrangement shown in FIGURE 4 wherein the control electrode 2 is in the form of a grid which may conveniently be substantially the same in geometry and dimension as the drain electrode 4 but so spaced that its grid portions are disposed in alignment with the openings in the drain electrode.

Figure 4:
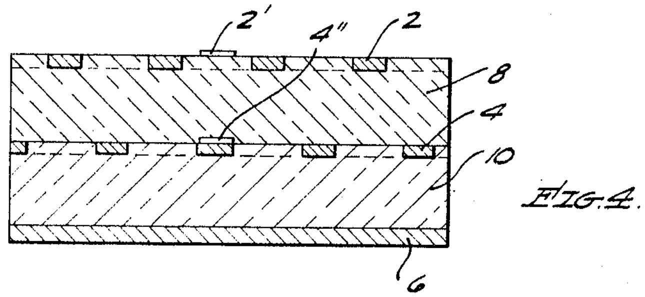
FIGURE 4 is a cross-sectional elevational view of another embodiment of a solid state triode device according to the invention.
Figure 5:
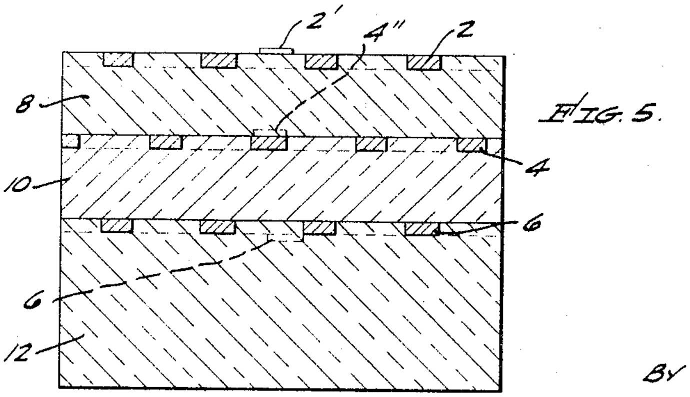
FIGURE 5 is a cross-sectional elevational view of another embodiment of a solid state triode device according to the invention.

In FIGURE 5 another arrangement is shown which combines the advantages of the embodiment shown in FIGURES 3 and 4. In this embodiment all three electrodes are of the grid-type with the grid portions of the control and source electrodes 2 and 6 being disposed in alignment with each other and with the openings in the drain electrode 4.

Figure 6:
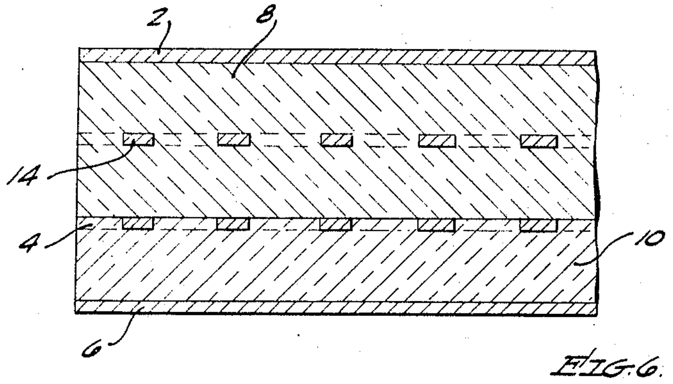
FIGURE 6 is a cross-sectional elevational view of a solid state tetrode device according to the invention.

In the embodiments described so far a three-element device has been disclosed. In FIGURE 6 a tetrode device is shown in which a second control electrode 14 is disposed between the control and drain electrodes 2 and 4 in order to enhance reduction of the feed-back capacitance between the drain and control electrodes. Borrowing a term by analogy to vacuum tubes this second control electrode 14 may be called a "screen grid." The electrode 14 may have substantially the same geometry and dimensions as the drain electrode and is disposed so that its grid portions and openings are aligned with the grid portions and openings in the drain electrode 4. In FIGURE 7 another embodiment is shown of a tetrode device in which the feed-back capacitance between the drain and control electrodes 2 and 6 is further reduced by the use of a screen grid electrode 14 disposed between the control and drain electrodes and by utilizing a grid-type control electrode 2 in accordance with the embodiment shown in FIGURE 4. In FIGURE 7 a further embodiment is shown where the advantages of the triode embodiment of FIGURE 5 are obtained for a tetrode device. In the device of FIGURE 8 all electrodes are of the grid-type with the control and source electrodes having their grid portions aligned and exposed to each other through the openings in the screen and drain electrodes whose grid portions are aligned with each other.

There thus has been shown and described a novel solid state triode or tetrode electrical device in which the spacing between two of the electrodes, the source and drain, may be established as desired due to disposition of the control electrode in a portion other than between these two electrodes. Embodiments of the invention have also been described in which enhancement of the control of the current flowing between the source and drain electrodes is achieved as well as enhancement of the reduction of capacitance between the control electrode and the drain electrode.

What is claimed is:

1. An electrical device comprising: a source electrode and a drain electrode; said drain electrode having openings therethrough; a body of semi-insulator material disposed between said source and drain electrodes; and a control electrode adjacent said drain electrode and electrically insulated therefrom and from said semi-insulator body.

2. An electrical device comprising: a source electrode and a drain electrode, said drain electrode having openings therethrough; a body of semi-insulator material disposed between said source and drain electrodes; and a control electrode having openings therethrough disposed adjacent said drain electrode and electrically insulated therefrom and from said body of semi-insulator material.

3. An electrical device comprising: a source electrode and a drain electrode; said drain electrode having perforate and imperforate portions; a body of semi-insulator material disposed between said source and drain electrodes; and a control electrode having perforate and imperforate portions disposed adjacent said drain electrode and electrically insulated therefrom and from said semi-insulator material; the imperforate portions of said control electrode being disposed in alignment with the perforate portions of said drain electrode.

4. An electrical device comprising: a source electrode and a drain electrode each having perforate and imperforate portions; a body of semi-insulator material disposed between said source and drain electrodes; and a control electrode having perforate and imperforate portions disposed adjacent said drain electrode and electrically insulated therefrom and from said body of semi-insulator material.

5. The invention according to claim 4 wherein the imperforate portions of said control electrode are disposed in alignment with the perforate portions of said drain electrode.

6. The invention according to claim 4 wherein the imperforate portions of said control and source electrodes are disposed in alignment with each other and with the perforate portions of said drain electrode.

7. An electrical device comprising: a source electrode and a drain electrode; said drain electrode having perforate and imperforate portions; a body of semi-insulator material disposed between said source and drain electrodes; a first control electrode disposed adjacent said drain electrode and electrically insulated therefrom and from said body of semi-insulator material; and a second control electrode disposed between said first control electrode and said drain electrode; said second control electrode having perforate and imperforate portions disposed in alignment with said perforate and imperforate portions of said drain electrode, respectively, and electrically insulated from said first control electrode and said drain electrode and from said body of semi-insulator material.

8. An electrical device comprising: a source electrode and a drain electrode; a body of semi-insulator material disposed between said source and drain electrodes; a control electrode disposed adjacent said drain electrode; a second control electrode disposed between said drain electrode; said control electrodes being electrically insulated from each other and from said drain electrode and said body of semi-insulator material; said drain electrode and said first and second control electrodes having perforate and imperforate portions; the said perforate and imperforate portions of said second control electrode and said drain electrode being disposed in alignment with each other, respectively; said perforate and imperforate portions of said first control electrode being in alignment with said imperforate and perforate portions of said drain and said second control electrodes.

9. An electrical device comprising: a source electrode and a drain electrode; a body of semi-insulator material disposed between said source and drain electrodes; a first control electrode disposed adjacent said drain electrode; a second control electrode being disposed between said first control electrode and said drain electrode; said first and second control electrodes being electrically insulated from each other and from said drain electrode and said body of semi-insulator material; all of said electrodes having perforate and imperforate portions; the perforate and imperforate portions of said second control electrode and said drain electrode being in alignment with each other, respectively; the perforate and imperforate portions of said first control and said source electrode being in alignment with each other, respectively, and in alignment with the imperforate and perforate portions of said second control electrode and said drain electrode, respectively.

10. An electrical device comprising: a layer of semi-insulator material disposed between first and second layers of electrically conductive material constituting, respectively, drain and source electrodes; said drain electrode having openings therein; a layer of electrically insulating material disposed on said drain electrode layer and on said semi-insulator layer through said openings in said drain electrode layer; a layer of electrically conductive material constituting a control electrode disposed on said layer of electrically insulating material.

11. An electrical device comprising: a source electrode and a drain electrode; said drain electrode having grid portions with openings therethrough; a body of semi-insulator material disposed between said source and drain electrodes; and a control electrode adjacent said drain electrode and electrically insulated therefrom and from said semi-insulator body; the distances between said drain electrode and said source and control electrodes being no greater than the distance between said grid portions of said drain electrode.

12. An electrical device comprising: a layer of semi-insulator material disposed between first and second layers of electrically conductive material constituting, respectively, drain and source electrodes; a layer of electrically insulating material disposed on said drain electrode layer; a third electrically conductive layer constituting a first control electrode disposed on said layer of electrically insulating material; a fourth electrically conductive layer constituting a second control electrode disposed in said layer of electrically insulating material and between said drain and said first control electrode layers; and said second control electrode layer and said drain electrode layer having perforate and imperforate portions in alignment with each other, respectively.

13. An electrical device comprising: a layer of semi-insulator material disposed between first and second layers of electrically conductive material constituting, respectively, drain and source electrodes; a layer of electrically insulating material disposed on said drain electrode layer; a third electrically conductive layer constituting a first control electrode disposed on said layer of electrically insulating material; a fourth electrically conductive layer constituting a second control electrode disposed in said layer of electrically insulating material and between said drain and said first control electrode layers; all of said electrode layers have perforate and imperforate portions with the perforate and imperforate portions of said source and said first control electrode layers in alignment with each other, respectively, and the perforate and imperforate portions of said drain and said second control electrode are in alignment with each other, respectively, and with the perforate portions thereof being in alignment with the imperforate portions of said source and said first control electrode layers.

References Cited by the Examiner

UNITED STATES PATENTS

| | | | |
|---|---|---|---|
| 2,428,400 | 10/1947 | Vangeel | 317—234 |
| 3,056,073 | 9/1962 | Mead | 317—234 |
| 3,191,061 | 6/1965 | Weimer | 317—234 |

FOREIGN PATENTS

| | | |
|---|---|---|
| 500,342 | 2/1939 | Great Britain. |
| 500,344 | 2/1939 | Great Britain. |

JOHN W. HUCKERT, *Primary Examiner.*

A. J. JAMES, *Assistant Examiner.*